UNITED STATES PATENT OFFICE.

JULIUS BUNZL, OF SAN FRANCISCO, CALIFORNIA, ASSIGNOR TO THE I X L TAMALE COMPANY, OF SAME PLACE.

CANNED TAMALES.

SPECIFICATION forming part of Letters Patent No. 620,084, dated February 21, 1899.

Application filed June 15, 1897. Serial No. 640,897. (No specimens.)

*To all whom it may concern:*

Be it known that I, JULIUS BUNZL, a citizen of the United States, residing at San Francisco, in the county of San Francisco and State of California, have invented certain new and useful Improvements in Canned Tamales; and I do hereby declare the following to be a full, clear, and exact description of said invention, such as will enable others skilled in the art to which it most nearly appertains to make, use, and practice the same.

My invention has reference to a new canned product which I call "canned tamale." The tamale of commerce is a Mexican product composed of cornmeal cooked and spread in a thin layer upon corn-husks. Cooked chicken or other fowl is then mixed with a chilli-sauce and rolled up in this meal-coated husk into a cylindrical form and the ends tied with a string or piece of corn-husk, thus forming what is known and sold as "Mexican tamales."

The object of my invention is to prepare the same ingredients which are used in the manufacture of these Mexican tamales in such manner and by an improved process and method of canning by which they can be put up and hermetically sealed in tin cans, and thus be sold as a new canned product. In order to do this, I take corn in the grain and boil it until it has been perfectly cooked, after which I allow it to become dry and hard either by evaporation or by natural drying process. If desired, a small quantity of lime or soda may be added to the water in cooking the corn; but this is not absolutely necessary. I then take the dried corn and grind it to a meal. Then I take this meal and mix it with a small quantity—say two ounces—of lard to a pound of meal and then add hot water and mix and knead it until it is reduced to a dough or paste. This dough or paste is then evaporated until the water it contains is abstracted, and then I take a portion of it and spread or plaster it in a thin layer upon the bottom and sides of the can in which the compound is to be sealed. This leaves the central portion of the can open to receive the chicken, sauces, &c. The inside ingredients, consisting of bits of cooked chicken, fowl, or other meat, are mixed with the chilli-sauce, which is prepared in the usual way, and after the addition of such spices and fruits, the latter usually olives, the interior cavity in the can is filled to near the top with this latter compound. I then fill in on top of the whole layer of the meal dough above described and close and hermetically seal the top of the can. This tamale compound thus prepared and sealed will keep an indefinite length of time in a perfectly fresh and sweet condition. When it is to be used, the preferable way is to place the can in hot water and allow it to remain until the whole has become thoroughly heated through before opening the can. This heating operation causes the meal dough to absorb the sauces from the interior, so that it will furnish a perfect canned substitute for the Mexican tamale.

Having thus described my invention, what I claim, and desire to secure by Letters Patent, is—

1. The process of preparing cornmeal dough for canned products, which consists in, first, cooking the corn in the hull, then drying and grinding the same, then mixing the same with lard and water to form a dough, and, lastly, evaporating the water contained in the dough without baking the dough, substantially as described.

2. As a new product, tamale compounds inclosed in an unbaked paste of cornmeal and lard from which the water has been evaporated, substantially as described.

In testimony whereof I have hereunto signed my name, in the presence of two witnesses, this 10th day of May, A. D. 1897.

JULIUS BUNZL.

Witnesses:
GEO. LEZINSKY,
W. R. BOONE.